(12) United States Patent
Swanson

(10) Patent No.: US 12,089,681 B2
(45) Date of Patent: Sep. 17, 2024

(54) DEVICE TO RETAIN A DOOR CHOCK TO A FIREFIGHTER HELMET

(71) Applicant: Todd K. Swanson, North Kingstown, RI (US)

(72) Inventor: Todd K. Swanson, North Kingstown, RI (US)

( * ) Notice: Subject to any disclaimer, the term of this patent is extended or adjusted under 35 U.S.C. 154(b) by 590 days.

(21) Appl. No.: 17/290,990

(22) PCT Filed: Nov. 1, 2019

(86) PCT No.: PCT/US2019/059533
§ 371 (c)(1),
(2) Date: May 3, 2021

(87) PCT Pub. No.: WO2020/093004
PCT Pub. Date: May 7, 2020

(65) Prior Publication Data
US 2022/0071331 A1 Mar. 10, 2022

Related U.S. Application Data

(60) Provisional application No. 62/754,018, filed on Nov. 1, 2018, provisional application No. 62/927,873, filed on Oct. 30, 2019.

(51) Int. Cl.
*A42B 1/24* (2021.01)
*A42B 3/04* (2006.01)
*A62B 3/00* (2006.01)
*E05C 17/54* (2006.01)
*F16B 2/06* (2006.01)

(52) U.S. Cl.
CPC ............... *A42B 1/24* (2013.01); *A42B 3/04* (2013.01); *A62B 3/00* (2013.01); *E05C 17/54* (2013.01); *F16B 2/065* (2013.01)

(58) Field of Classification Search
CPC .......... A42B 1/24; A42B 3/04; A42B 3/0406; E05C 17/54; F16B 2/065; A62B 3/00; A62B 3/005
See application file for complete search history.

(56) References Cited

U.S. PATENT DOCUMENTS

| | | | | |
|---|---|---|---|---|
| 3,013,320 | A * | 12/1961 | Miller | A42B 3/04 269/97 |
| 5,121,508 | A * | 6/1992 | Grilliot | A42B 3/14 2/5 |
| 5,291,880 | A * | 3/1994 | Almovist | A42B 3/288 2/5 |
| 5,658,065 | A * | 8/1997 | Jamieson | A42B 3/04 2/6.2 |
| 6,490,729 | B1 * | 12/2002 | Dondero | A61F 9/02 2/10 |
| 7,156,536 | B1 * | 1/2007 | McCorkle | A42B 3/04 362/396 |
| 7,866,813 | B2 * | 1/2011 | Anhalt | A42B 1/247 2/209.13 |
| 10,627,056 | B2 * | 4/2020 | Sharrah | F21L 4/025 |

(Continued)

*Primary Examiner* — Robert Sandy
*Assistant Examiner* — Louis A Mercado
(74) *Attorney, Agent, or Firm* — FEENEY IP LAW; Alan F. Feeney; Logan Faucher

(57) ABSTRACT

A device to secure a door chock to an industrial helmet more particularly a firefighter's helmet.

16 Claims, 12 Drawing Sheets

(56) References Cited

U.S. PATENT DOCUMENTS

| | | | |
|---|---|---|---|
| 2003/0051317 A1* | 3/2003 | Preziosi | A42B 1/24 24/3.12 |
| 2009/0039660 A1* | 2/2009 | Gonzalez | C09K 21/10 252/607 |
| 2009/0190332 A1* | 7/2009 | Sharrah | F21V 21/0885 362/105 |
| 2009/0283558 A1* | 11/2009 | Wanzer | A42B 3/044 362/106 |

* cited by examiner

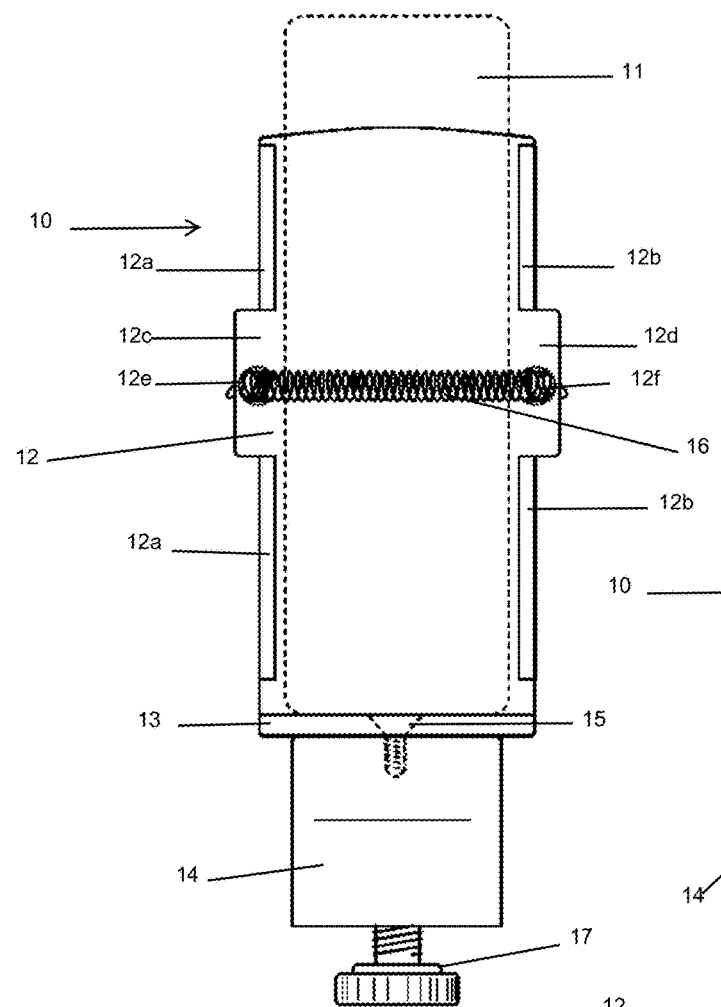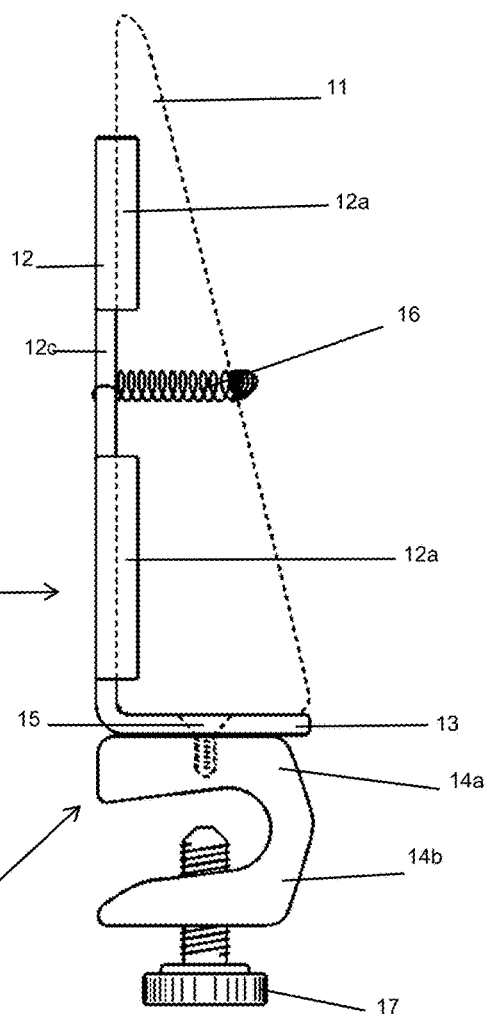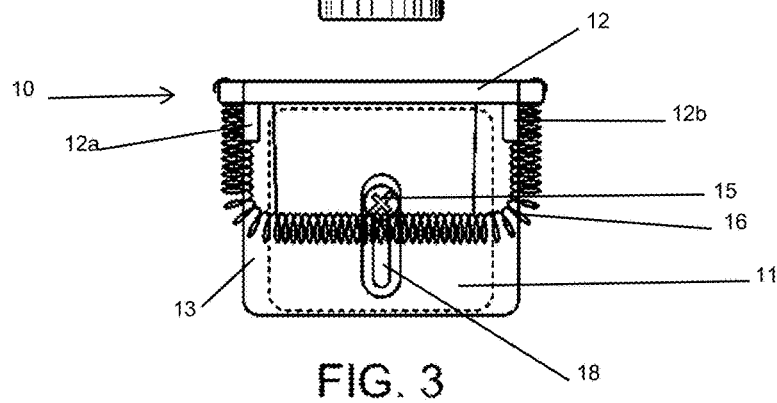

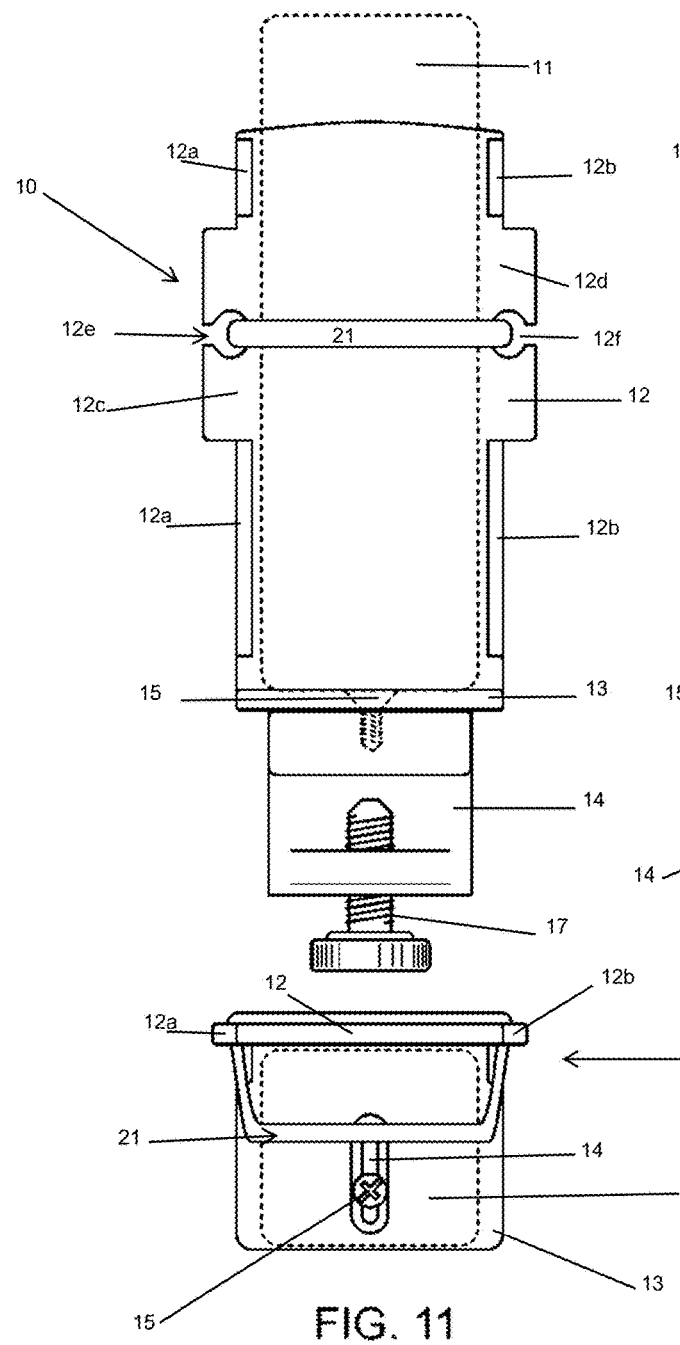
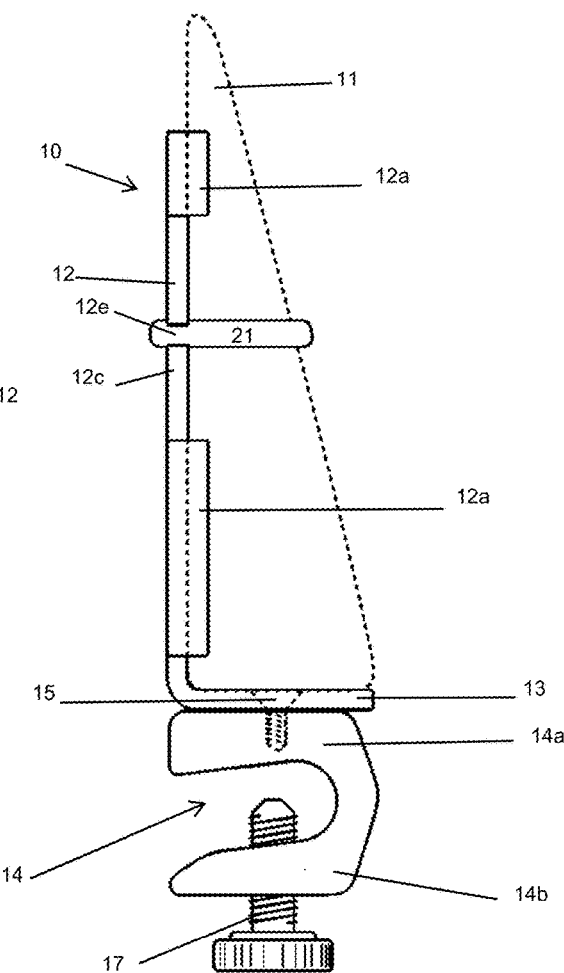
FIG. 9
FIG. 10
FIG. 11

FIG. 12
FIG. 13
FIG. 14
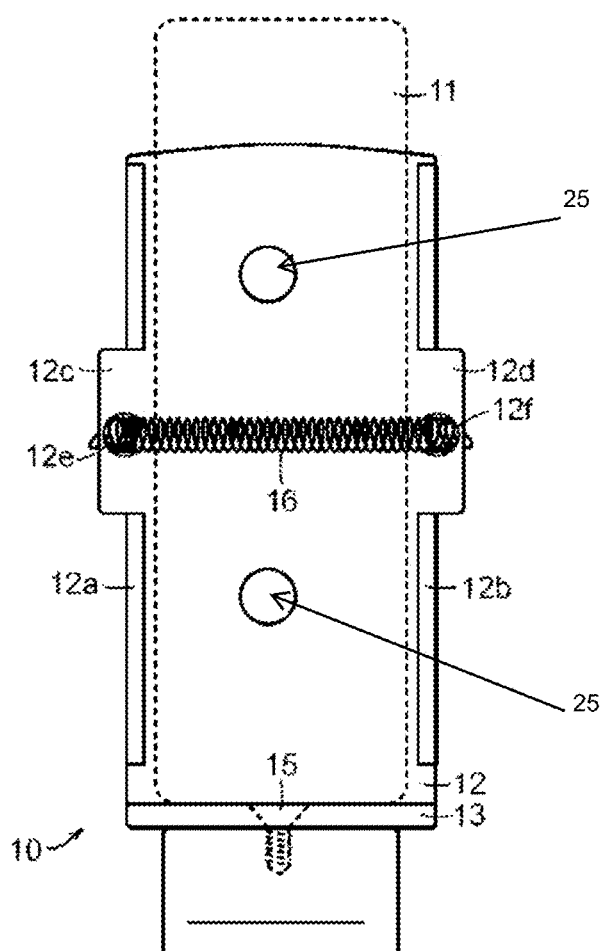
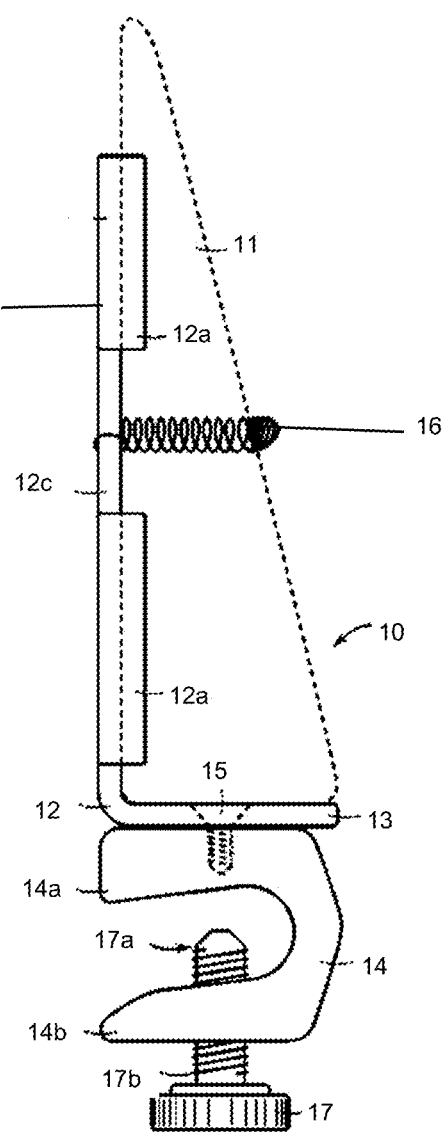
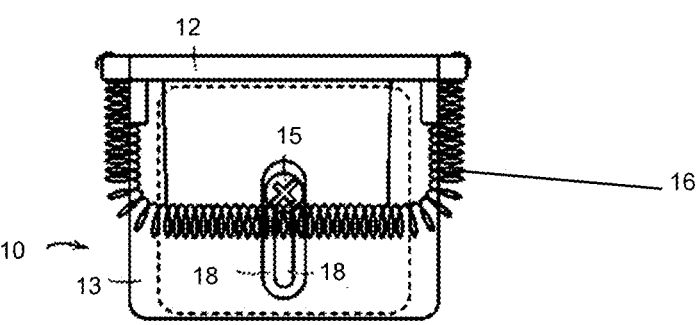

FIG. 17
FIG. 18
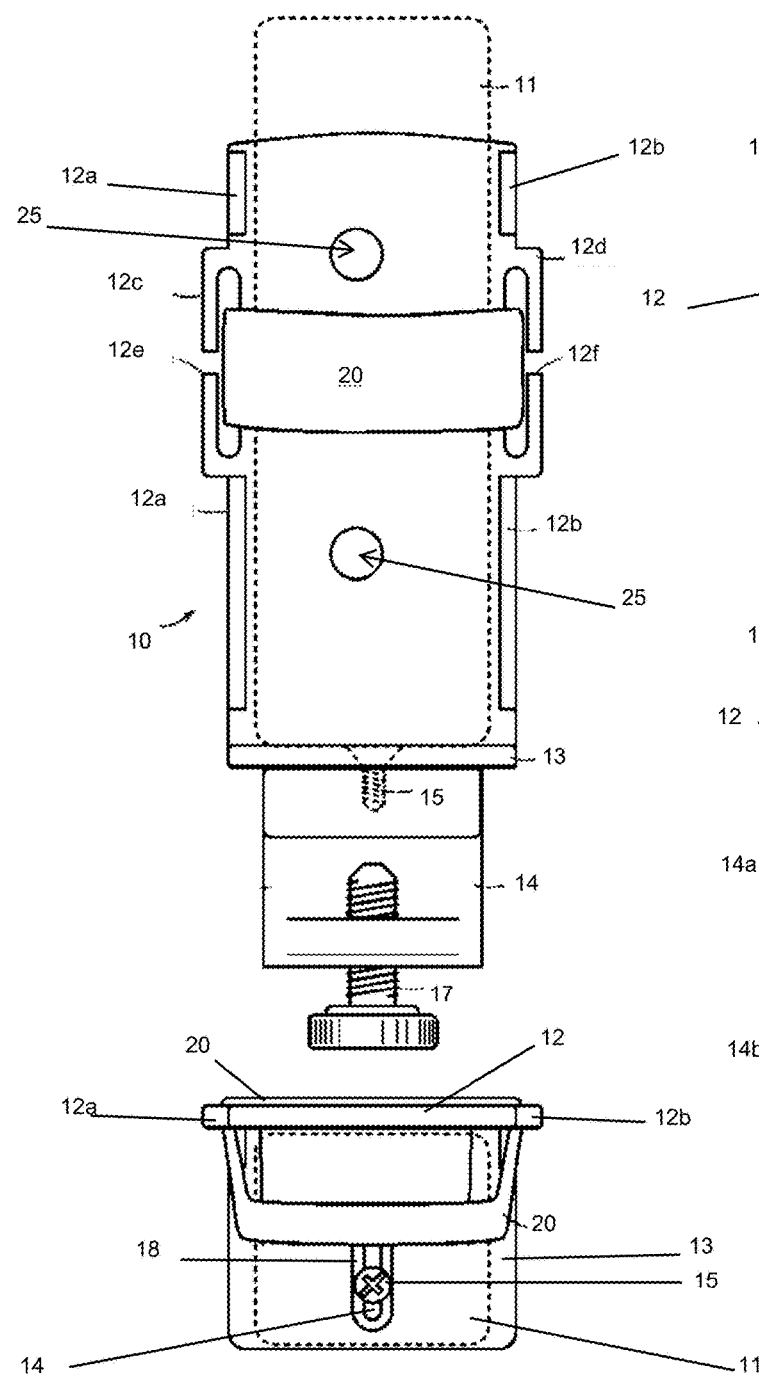
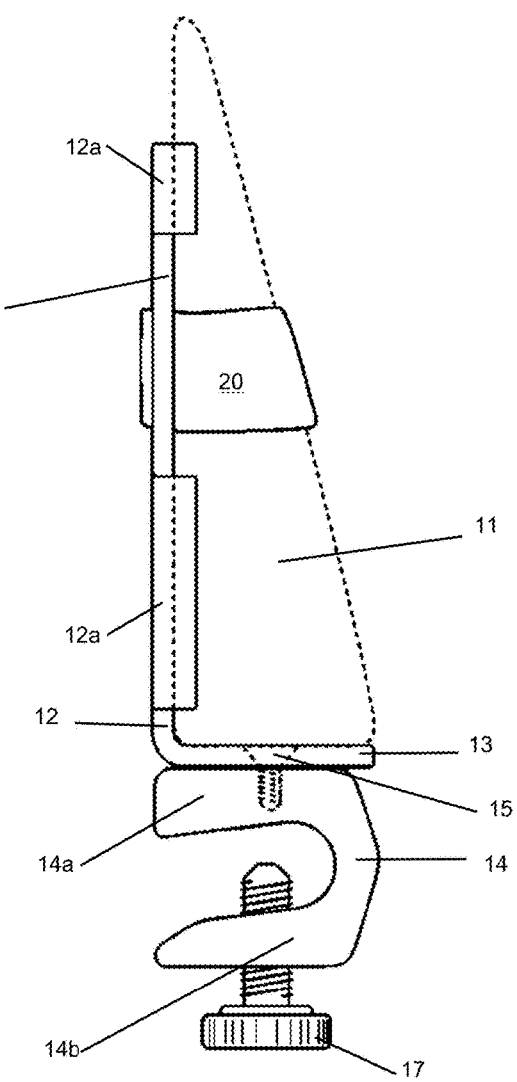
FIG. 19

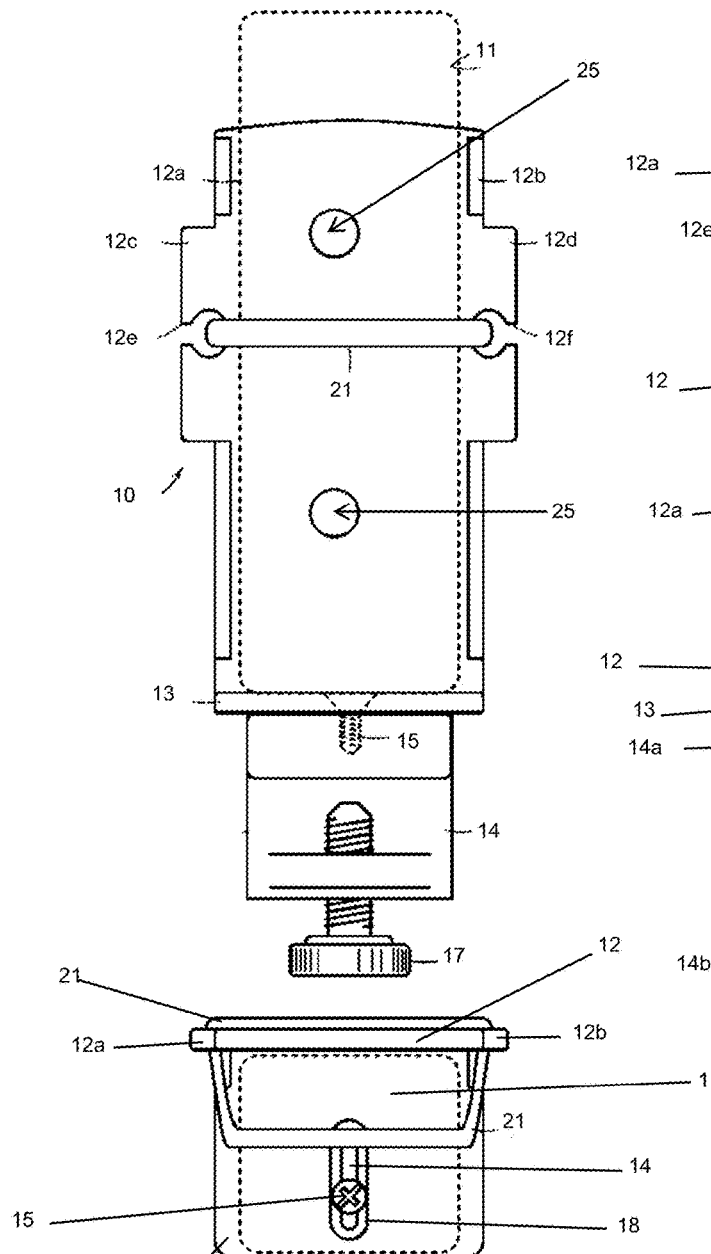
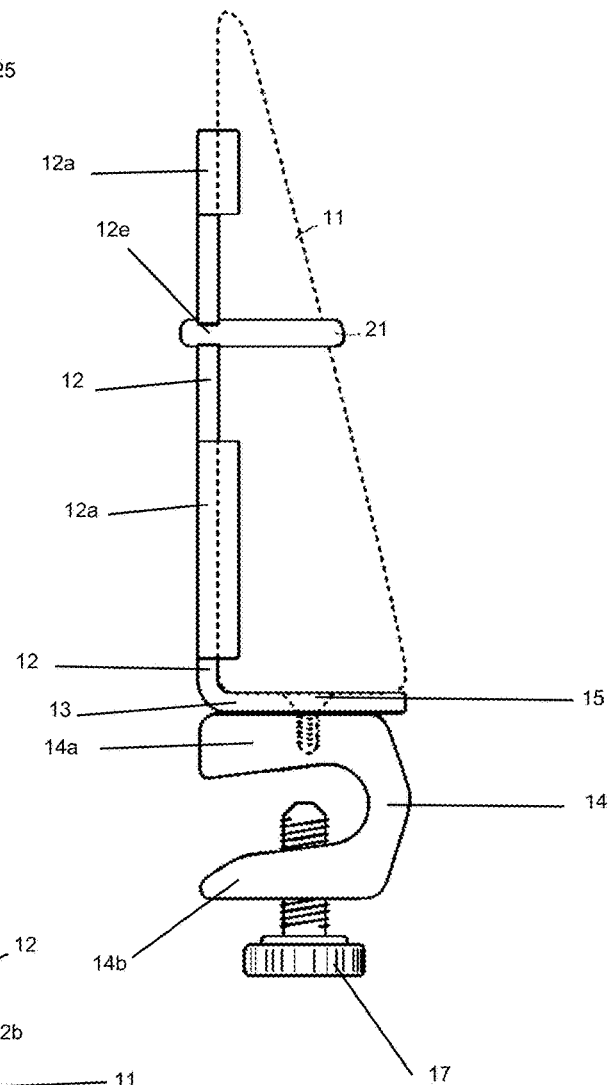

DEVICE TO RETAIN A DOOR CHOCK TO A FIREFIGHTER HELMET

CROSS REFERENCE TO RELATED APPLICATIONS

This application is a continuation under 35 U.S.C. § 371 of International Application No. PCT/US/2019/059533 filed on Nov. 1, 2019, that claims priority to and the benefit of U.S. Provisional Patent Application No. 62/754,018 filed Nov. 1, 2018 and U.S. Provisional Patent Application No. 62/927,873 filed Oct. 30, 2019, the entire contents of each are incorporated by reference herein.

BACKGROUND OF THE INVENTION

Firefighters are routinely confronted with unpredictable situations. In addition to carrying tools such as axes and crowbars, a firefighter must often hold, transport and operate a fire-hose nozzle for prolonged durations. In many instances, a firefighter encounters self-closing doors which are prevalent in apartment buildings, public schools, hospitals, offices and many other buildings. These doors impede a firefighter's entry into a room causing a potentially dangerous delay.

One of the most valuable tools used by a firefighter is a door chock (also known as a door stop or door wedge) which enables the firefighter the ability to keep such self-closing doors open while he/she moves equipment from one room to the next. If a large building is on fire, the firefighter may have to use the door chock several times as he/she moves from one room to the next. It is imperative that the firefighter can access his/her door chock at all times.

Currently, firefighters retain their door chock on their helmet using a large rubber band that fits around their helmet. There are several problems associated with the use of a standard rubber band. First, not all fire helmets are designed the same so one rubber band may not be as useful for one helmet as opposed to another. Second, it may be difficult, particularly when the firefighter is wearing gloves, to access the rubber band to release the door chock and then secure it again behind the rubber band particularly when the rubber band is wet or covered in flame-retardant foam. As mentioned previously, many fires require a firefighter to move from one room to the next constantly using their door chock to keep doors open. As such, it is vital to a firefighter's safety to be able to retrieve their door chock from their helmet and, after use, secure it to their helmet for the next closed door. Third, if the firefighter does not properly secure the door chock under the rubber band, the door chock can become lose and fall off the firefighter's helmet which can be problematic in conditions where visibility is a factor. Fourth, the firefighter may forget where on his/her helmet the door chock is located causing unnecessary delay when any delay can be critical. Fifth, when the rubber band is wet or exposed to foam, it tends to slide off the smoother surface of most fire helmets. Finally, the rubber bands currently used are not sufficiently chemical, impact or heat resistant and have a tendency to degrade quickly requiring frequent replacement thereof.

Accordingly, there is currently a need for a device that assists a firefighter with retaining a door chock to his or her helmet that is impact and chemical resistant, anti-static, resistant to chemicals, lightweight, waterproof and up to 500° heat resistant and easy to use.

BRIEF SUMMARY OF THE INVENTION

The present invention relates to a device to secure a common door chock (otherwise known as a door stop or door wedge) to an industrial helmet, more particularly a firefighter's helmet, wherein said device is comprised of an L-shaped body in which the door chock is positioned, a clamp capable that can be securely affixed to the brim of an industrial helmet, bore formed into said L-shaped body in which a screw can be inserted through and into said clamp and means to retain said door chock within said L-shaped body, such as a spring loop, rubber strap or o-ring or the like.

BRIEF DESCRIPTION OF THE SEVERAL VIEWS OF THE DRAWINGS

FIG. 1 is a front view of the claimed invention in which a door chock (represented by dotted lines) has been secured to the device by a spring;

FIG. 2 is a side view of the claimed invention in which a door chock (represented by dotted lines) has been secured to the device by a spring;

FIG. 3 is a bottom view of the claimed invention in which a door chock has been secured to the device by a spring;

FIG. 9 is a front view of the claimed invention in which a door chock (represented by dotted lines) has been secured to the device by an o-ring;

FIG. 10 is a side view of the claimed invention in which a door chock (represented by dotted lines) has been secured to the device by an o-ring;

FIG. 11 is a bottom view of the claimed invention in which a door chock has been secured to the device by an o-ring;

FIG. 12 is a front view of a second embodiment wherein holes are formed in the planar vertical section of the L-shaped body and a door chock (represented by dotted lines) has been secured to the device by a spring;

FIG. 13 is a side view of a second embodiment according to FIG. 12 after a door chock (represented by dotted lines) has been secured to the device by a spring;

FIG. 14 is a bottom view of a second embodiment according to FIG. 12 after a door chock has been secured to the device by a spring;

FIG. 17 is a front view of a second embodiment according to FIG. 12 in which a door chock (represented by dotted lines) has been secured to the device by a rubber strap;

FIG. 18 is a side view of a second embodiment according to FIG. 12 in which a door chock (represented by dotted lines) has been secured to the device by a rubber strap;

FIG. 19 is a bottom view of a second embodiment according to FIG. 12 in which a door chock has been secured to the device by a rubber strap;

FIG. 20 is a front view of a second embodiment according to FIG. 12 in which a door chock (represented by dotted lines) has been secured to the device by an o-ring;

FIG. 21 is a side view of a second embodiment according to FIG. 12 in which a door chock (represented by dotted lines) has been secured to the device by an o-ring;

FIG. 22 is a bottom view of a second embodiment according to FIG. 12 in which a door chock has been secured to the device by an o-ring;

DETAILED DESCRIPTION OF THE INVENTION

Definitions

Figure 4:
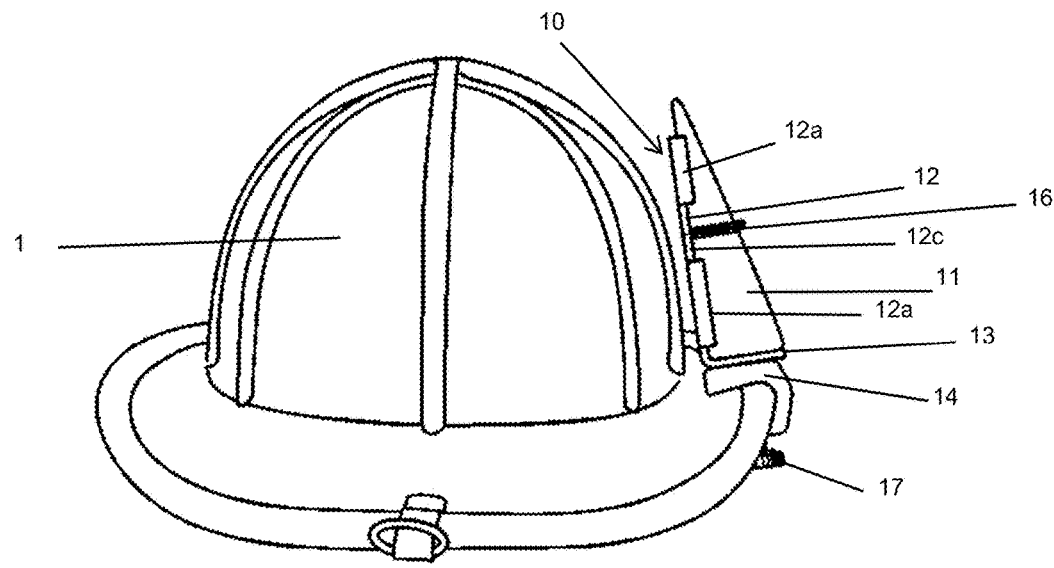
FIG. 4 is an illustration of the claimed invention (side view) with an installed door chock after said invention has been attached to a standard firefighter's helmet.

As used herein, the term "bore" refers to a hole or passage made by or as if by use of a drill.

As used herein, the term "brim" refers to a projecting rim or edge, especially around the bottom of a helmet.

As used herein, the term "bungee cord" (also referred to as a shock cord, occy strap or octopus strap), refers to an elastic cord composed of one or more elastic strands forming a core, usually covered in a woven cotton or polypropylene sheath.

As used herein, the term "cable tie" (also known as a wire tie, hose tie, steggel tie, zap strap or zip tie, and marketed under the brand names Ty-Rap® and Panduit®), refers to an elastic device commonly made of nylon, has a flexible tape section with teeth that engage with a pawl in the head to form a ratchet so that as the free end of the tape section is pulled, the cable tie tightens and does not come undone. Preferably, cable ties used in the present invention include a tab that can be depressed to release the ratchet so that the cable tie can be loosened to allow the firefighter to loosen the tie and retrieve the chock.

As used herein, the term "circle cotter" (also known as a cotter ring or split ring) refers to a wire fastener that is shaped like a circle. A similar type of fastener is a knockout ring having an upward tab bent upward as opposed to the circle cotter having an inwardly bent open tab.

As used herein, the term "o-ring" (also known as a packing) refers to a loop of elastomer with a round cross-section.

As used herein, the term "planar," refers to the form of a plane, i.e. a flat surface.

As used herein, the term "R-clip" (also known as an R-pin, R-key, hairpin cotter pin, hairpin cotter, bridge pin, hitch pin or spring cotter) refers to a fastener made of a springy material, commonly hardened metal wire, resembling the shape of the letter "R".

As used herein, the term "relatively," refers to a relative manner; in comparison with something else, but not absolutely.

As used herein, the term "rubber band" (also known as an elastic band, gum band or lacky band) refers to a loop of rubber, usually ring shaped, manufactured out of natural rubber or a man-made elastomer.

As used herein, the term "serrated," refers to having a saw-toothed edge or margin notched with toothlike projections.

As used herein, the term "snug fit," refers to the closest fit that can be assembled by hand for parts that are not to move against each other.

As used herein, the term "thumb screw," refers to a screw having a flat-sided or knurled head so that it may be turned by the thumb and index finger.

As used herein, the term "traverse," refers to travel or pass across, over, or through.

As used herein, the term "threaded," refers to something with a helical or spiral ridge.

As depicted in FIG. 1, the instant invention is directed to a device to secure a door chock (otherwise known as a door stop or a door wedge) 11 (indicated by dotted lines) to an industrial helmet, in particular, a firefighter's helmet 1. The device is comprised of an L-shaped body 10 having a relatively flat planar vertical section 12 and a relatively flat planar horizontal section 13. A c clamp 14 is used to attach the device to a firefighter's helmet 1. In the preferred embodiment, the L-shaped body 10 is secured to said c clamp 14 via a mounting screw 15 (shown in outline) inserted into an elongated mounting bore hole (not shown) drilled completely through the horizontal section 13, i.e. an elongated mounting bore hole 18 that traverses the width of the planar horizontal section 13 of the L-shaped body 10 and into the c clamp 14 which may or may not have a previously formed opposing bore hole. The elongated mounting bore hole 18 formed in the planar horizontal section 13 and, if present, a bore hole drilled into the c clamp 14, may optionally have threaded walls. The vertical section 12 of the L-shaped body 10 may contain opposing side walls 12a and 12b that run along its edges that extend outward. These side walls 12a and 12b may be at an angle to the vertical section 12 of the L-shaped body 10 or perpendicular thereto. These walls 12a and 12b provide a snug fit when the door chock 11 is installed into the device. The top of said side walls 12a and 12b may also have opposing flaps or "wings" 12c and 12d that extend horizontally outward from said side walls 12a and 12b. In other embodiments, the wings 12c and 12d may be folded upwards at varying angles or may be perpendicular to the surface of the vertical section 12 of the L-shaped body 10. These wings 12c and 12d contain horizontal cutouts or holes 12e or 12f capable of accepting the ends of the means in which to secure the door chock 11 to the device. In the preferred embodiment depicted in FIG. 1, a spring joined at both ends 16 is installed in the cutouts of holes 12e or 12f of the wings 12c and 12d. As depicted in FIG. 24, some embodiments may have wings 12c and 12d with more than one hole, preferably three. When in use, the firefighter slides the door chock 11 between the vertical section 12 of the L-shaped body 10 and the spring 16 which extends the spring 16 beyond its relaxed state. Once installed, the elastic nature of the spring 16 causes it to return to its relaxed state which exerts pressure on the door chock 11 retaining said door chock 11 within the L-shaped body 10 of the claimed device. The user may re-position the spring 16 by attaching the ends of same to opposing holes found in said wings 12c and 12d as shown in FIG. 24 to better secure the door chock 11 to the device as needed.

FIG. 2 is a side view of the claimed device wherein a door chock 11 (depicted by dotted lines) has been installed. In this embodiment, which differs from the embodiment depicted in FIG. 1, the opposing flaps or "wings" 12c that extend horizontally outward from the edges of the planar vertical section 12 of the L-shaped body 10 and not the top of the outwardly extending side walls 12a. In this embodiment, instead of continuous side walls running along the entire edges of the planar vertical section 12, said side walls 12a and 12b are broken up by the aforementioned wings 12c and 12d. As illustrated, a mounting screw (shown by a dotted line) 15 is inserted through the planar horizontal portion 13 of the L-shaped body 10 into the side 14a of the c clamp 14 that opposes the side 14b of c clamp 14 in which the thumb screw is 17 is located.

The firefighter uses the c clamp 14 to secure the device and door chock 11 retained therein to his/her helmet 1 by hooking the side 14a of the c clamp 14 across from the thumb screw 17, i.e. the leading edge 14a, above the rim while the side 14b of the c clamp 14 where the thumb screw 17 is situated, i.e. the trailing edge 14b, below the rim of the helmet 1. The firefighter turns the thumb screw 17 clockwise to drive the thumb screw 17 into the inner space of the c clamp 14 to engage the brim 19 of the helmet 1 securing the device to said helmet 1. When the firefighter wishes to remove or relocate the device, he/she turns the thumb screw 17 counterclockwise which withdraws the thumb screw 17 from the inner space and disengages said c clamp 14 from said helmet 1. The leading 14a and trailing 14b edges of the c clamp 14 may further contain flanges (not shown) facing the interior space of the c clamp 14 which can grip the brim 19 of the firefighter helmet 1.

FIG. 3 is a top view of the claimed device after the L-shaped body 10 has been anchored to the c clamp 14 from the perspective of the planar horizontal section 13. In this embodiment, an elongated mounting bore hole 18 is formed into the planar horizontal section 13 as opposed to a traditional bore. The elongated mounting bore hole 18 allows the user to slide the L-shaped body 10 via the mounting screw 15 along the length of the elongated mounting bore hole 18, thus repositioning the device closer to or away from the user's helmet 1 upon which the device is mounted.

FIG. 4 depicts the claimed device mounted to a traditional firefighter's helmet 1. The door chock 11 has been inserted into the L-shaped body 10 and is flush with planar vertical 12 and planar horizontal 13 sections of said L-shaped body 10. A closed spring 16 secures the door chock 11 to the L-shaped body 10. The outward facing side walls 12a that run along the lengths of the edges of the planer vertical section 12 further hold the door chock 11 within the device. The side 14a of the c clamp 14 that opposes the thumb screw 17 is shown engaging the brim 19 of said helmet 1. The side (not shown) of the c clamp 14 which contains the thumb screw 17 is positioned beneath the brim 19 of the helmet 1. To secure the device to the helmet 1, the user rotates the thumb screw 17 clockwise causing it to engage with the underside of the brim 19 of the helmet 1 until sufficient force is exerted and the thumb screw 17 cannot be rotated any further.

It should be appreciated that in other embodiments, rotation of the thumb screw 17 counterclockwise results in the thumb screw 17 to engage the helmet 1 upon which is mounted securing the device to said helmet 1.

The head 17b of the thumb screw 17 may be serrated to allow the user with a better grip in wet or other undesirable environmental conditions. The thumb screw 17 shank 17a is generally threaded.

Figure 5:
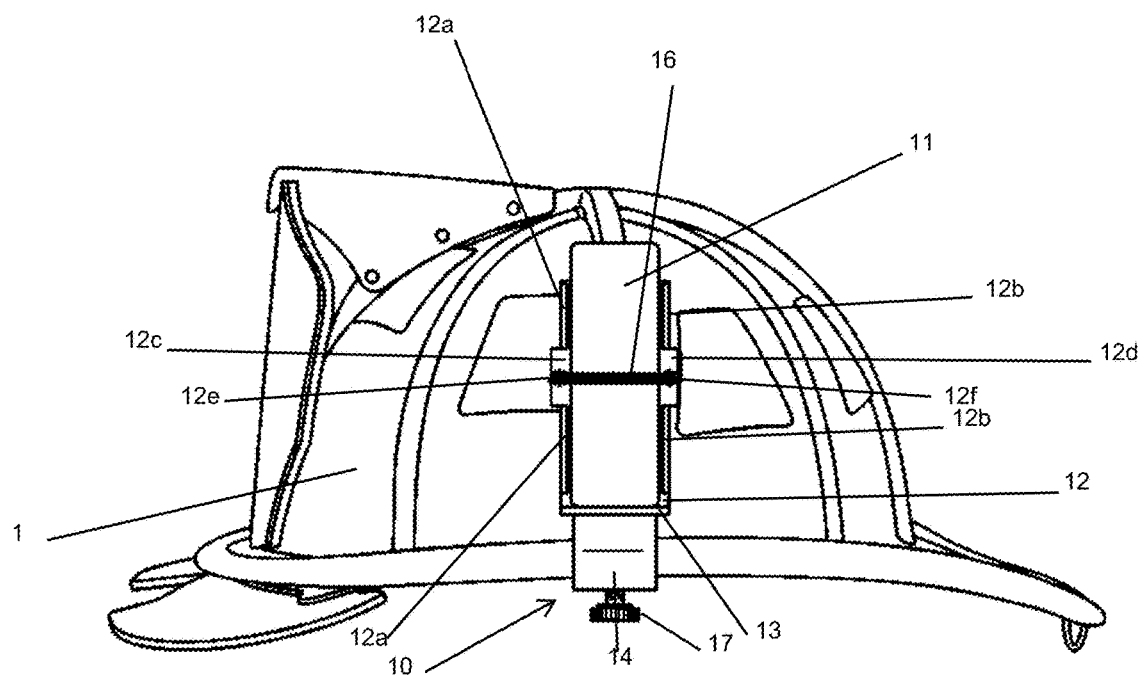
FIG. 5 is an illustration of the claimed invention (front view) with an installed door chock after said invention has been attached to a standard firefighter's helmet.

FIG. 5 shows a side view of the claimed device mounted to a modern firefighter's helmet 1. The door chock 11 has been inserted into the L-shaped body 10 and is flush with planar vertical 12 and planar horizontal 13 sections of said L-shaped body 10. A closed spring 16 secures the door chock 11 to the L-shaped body 10. The outward facing side walls 12a and 12b that run along the lengths of the edges of the planer vertical section 12 further hold the door chock 11 within the device. The side (not shown) of the c clamp 14 that opposes the thumb screw 17 engages the brim 19 of said helmet 1. The side (not shown) of the clamp 14 which contains the thumb screw 17 is positioned beneath the brim 19 of the helmet 1. To secure the device to the helmet 1, the user rotates the thumb screw 17 clockwise causing it to engage with the underside of the helmet 1 until sufficient force is exerted and the thumb screw 17 cannot be rotated any further.

Figure 6:
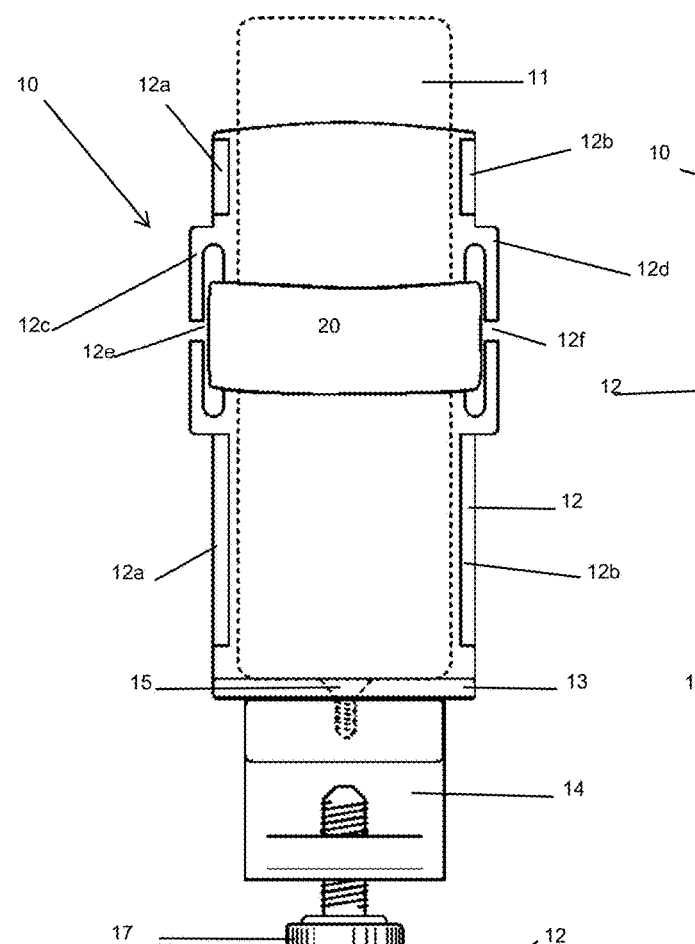
FIG. 6 is a front view of the claimed invention in which a door chock (represented by dotted lines) has been secured to the device by a rubber strap.

FIG. 6 depicts the invention of FIG. 1 when the c clamp 14 is positioned away from the user as opposed to FIGS. 1-5 having the c clamp 14 positioned towards the user exposing the inner space of the c clamp 14. The embodiment also utilizes a rubber strap 20 closed at both ends to secure the door chock 11 within the L-shaped body 10. To accommodate the wider strap 20, the opposing flaps or "wings" 12c and 12d are formed with reverse C-shaped cutouts 12e and 12f as opposed to the traditional circular bores found in the embodiments depicted in FIGS. 1-5. To insert the rubber strap 20 into the C-shaped cutouts 12e and 12f, the user can momentarily deform said strap 20 and then allow said strap 20 to return back to its normal state after installation.

The device is comprised of an L-shaped body 10 having a relatively flat planar vertical section 12 and a relatively flat planar horizontal section 13. A c clamp 14 is used to attach the device to a firefighter's helmet 1. In the preferred embodiment, the L-shaped body 10 is secured to said c clamp 14 via a mounting screw 15 (shown in outline) bore (not shown) drilled completely through the horizontal section 13 of the L-shaped body 10. The vertical section 12 of the L-shaped body 10 may contain opposing side walls 12a and 12b that run along its edges that extend outward. These walls 12a and 12b provide a snug fit when the door chock 11 is installed into the device. The top of said side walls 12a and 12b may also have opposing flaps or "wings" 12c and 12d that extend horizontally outward from said side walls 12a and 12b. These wings 12c and 12d contain cutouts or holes 12e or 12f capable of accepting the ends of the means in which to secure the door chock 11 to the device.

When in use, the firefighter slides the door chock 11 between the vertical section 12 of the L-shaped body 10 and the rubber strap 20 which extends the rubber strap 20 beyond its relaxed state. Once installed, the elastic nature of the rubber strap 20 causes it to return to its relaxed state exerting pressure on the door chock 11 which in turn retains said door chock 11 within the L-shaped body 10 of the claimed device.

Figure 7:
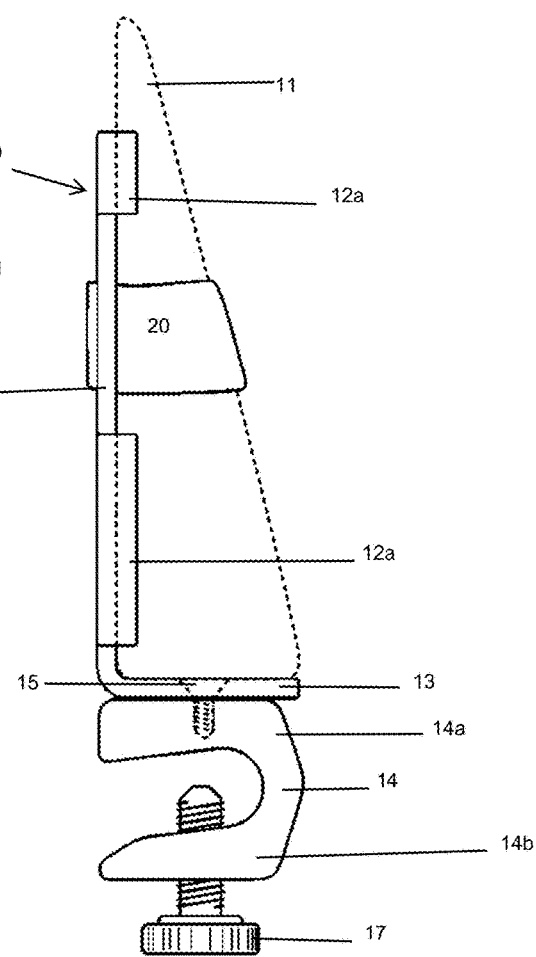
FIG. 7 is a side view of the claimed invention in which a door chock (represented by dotted lines) has been secured to the device by a rubber strap.

FIG. 7 is a side view of the claimed device as depicted in FIG. 2 wherein the spring 16 is replaced with a rubber strap 20 and instead of bore holes, C-shaped cutouts 12e and 12f are formed into opposing flaps or "wings" 12c and 12d that extend horizontally outward from said side walls 12a and 12b.

Figure 8:
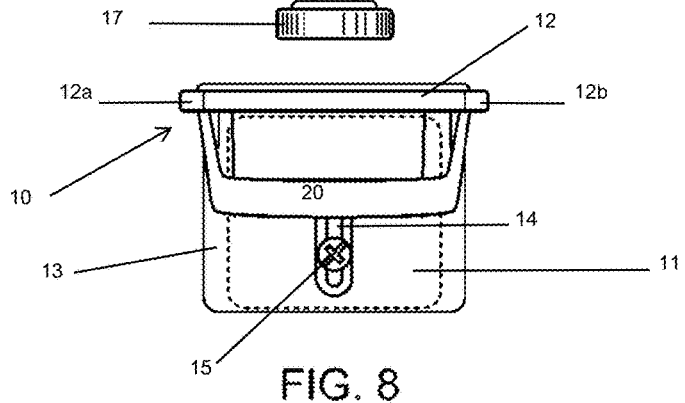
FIG. 8 is a bottom view of the claimed invention in which a door chock has been secured to the device by a rubber strap.
Figure 15:
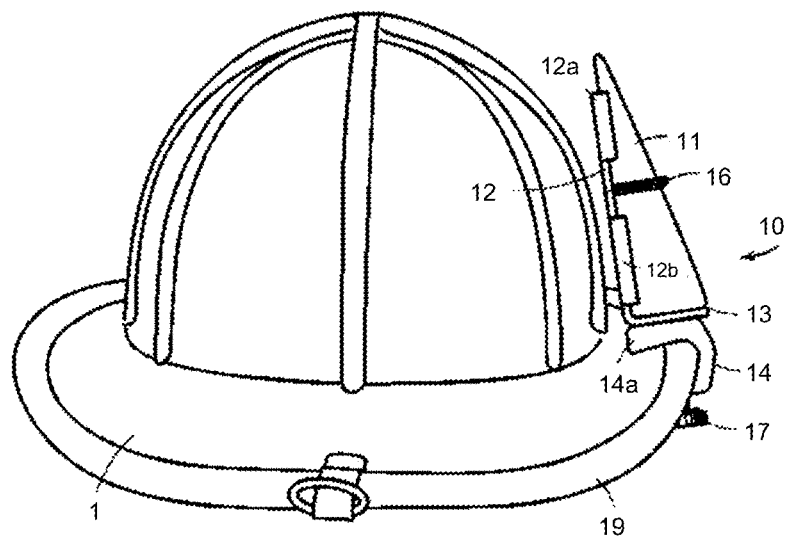
FIG. 15 is an illustration (side view) of a second embodiment according to FIG. 12 after a door chock has been secured to a firefighter's helmet.
Figure 16:
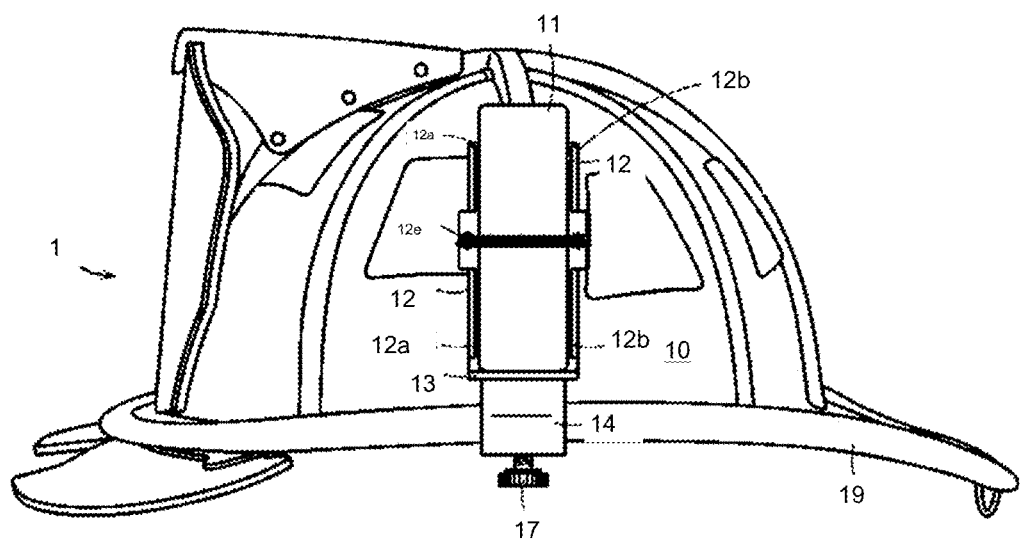
FIG. 16 is an illustration (front view) of a second embodiment according to FIG. 12 with an installed door chock after said invention has been attached to a standard firefighter's helmet.

FIG. 8 is the device as depicted in FIG. 3 wherein the spring is replaced with a rubber strap 20 and, instead of bore holes, C-shaped cutouts 12e and 12f are formed into opposing flaps or "wings" 12c and 12d that extend horizontally outward from said side walls 12a and 12b.

FIG. 9 depicts the invention of FIG. 1 when the c clamp 14 is positioned away from the user as opposed to the embodiments depicted in FIGS. 1-5 wherein the c clamp 14 is positioned towards the user. In this embodiment, the inner space of the c clamp 14 is exposed. This embodiment also utilizes an o-ring 21 closed at both ends to secure the door chock 11 within the L-shaped body 10. To accommodate the o-ring 21, the opposing flaps or "wings" 12c and 12d are formed with reverse stick-and-ball-shaped cutouts 12e and 12f as opposed to the traditional circular bores found in the embodiments depicted in FIGS. 1-5. To insert the o-ring 21 into the stick-and-ball-shaped cutouts 12e and 12f, the user can momentarily deform said o-ring 21 and then allow said o-ring 21 to return to its normal state after installation.

The device is comprised of an L-shaped body 10 having a relatively flat planar vertical section 12 and a relatively flat planar horizontal section 13. A c clamp 14 is used to attach the device to a firefighter's helmet. In the preferred embodiment, the L-shaped body 10 is secured to said c clamp 14 via a mounting screw 15 (shown in outline) bore (not shown) drilled completely through the horizontal section 13 of the L-shaped body 10. The vertical section 12 of the L-shaped body 10 may contain opposing side walls 12a and 12b that run along its edges that extend outward. These walls 12a and 12b provide a snug fit when the door chock 11 is installed into the device. The top of said side walls 12a and 12b may also have opposing flaps or "wings" 12c and 12d that extend horizontally outward from said side walls 12a and 12b. These wings 12c and 12d contain cutouts or holes 12e and 12f capable of accepting the ends of the means in which to secure the door chock 11 to the device.

When in use, the firefighter slides the door chock 11 between the vertical section 12 of the L-shaped body 10 and the o-ring 21 which extends the o-ring 21 beyond its relaxed state. Once installed, the elastic nature of the o-ring 21 causes it to return to its relaxed state which in turn exerts pressure on the door chock 11 retaining said door chock 11 within the L-shaped body 10 of the claimed device.

FIG. 10 is a side view of the claimed device as depicted in FIG. 9 wherein the spring 16 is replaced with an o-ring 21 and, instead of bore holes, stick-and-ball-shaped cutouts are formed into opposing flaps or "wings" 12c and 12d that extend horizontally outward from said side walls 12a and 12b.

FIG. 11 is the device as depicted in FIG. 9 wherein the spring 16 is replaced with an o-ring 21 and, instead of bore holes, stick-and-ball-shaped cutouts are formed into opposing flaps or "wings" 12c and 12d that extend horizontally outward from said side walls 12a and 12b.

FIGS. 12-22(A-H) (which parallel FIGS. 1-11) are depictions of a further embodiment of the instant invention wherein holes 25 have been formed into the planar vertical section 12 of the L-shaped body 10. The holes 25 serve two purposes. The user can use said holes 25 to further secure the claimed device to their helmet 1 by known means in the art, including, but not limited to, rubber bands 20, o-rings 21, closed springs 16, belts, screws, bolts, fasteners and the like. In addition, said holes 25 reduce the weight of the device which is crucial as most firefighter helmets are already heavy and most firefighters attach lights and other useful tools to their helmets.

The L-shaped body 10 may be formed using any number of known techniques to manufacture metal products, including, but not limited to, punching (or blanking), press forging, forging (or drop forging), rolling, thread rolling, extrusion, bending or casting, including die casting. The L-shaped body 10 may be custom made or mass-produced using known techniques in the art. If a metal or a metal composite is the desired material in which to produce the L-shaped body 10, iron, aluminum, copper, stainless steel, steel alloy, carbide or cermet are preferred. The L-shaped body 10 may also be made from a high polymer resin such as polyamide-imide (PAI), poly ether imide (PEI), polyacetal (POM), poly phenylene sulfide (PPS), poly ether ether ketone (PEEK), poly tetra fluoro ethylene (PTFE), polyamide 6 (PA6), polyethylene (PE), polypropylene (PP), vinyl chloride resin (VC), polystyrene (PS), polyethylene-telephthalate (PET), acrylonitrile butadiene (ABS). When using a polymer, the L-shaped body 10 may be prefabricated in several sizes, i.e. small, medium and large, or may be custom-made using an additive manufacturing process ("3D printing"), constructed using a molding, vacuum forming or thermal forming process, or any other known or yet to be discovered. The L-shaped body 10 may also be manufactured from ceramic or any combination of a metal (ferrous or nonferrous), ceramic or high polymer resin.

The sections of the L-shaped body 10, i.e. the flat planar vertical section 12, flat planar horizontal section 13, side walls 12a and 12b, opposing flaps or "wings" 12c and 12d and/or elongated mounting bore hole 18 may be formed as one unit using any known process, such as die casting, or from a single sheet of metal or each section may be formed individually and thereafter fused together using known methods such as welding, soldering, gluing or the like (except the elongated mounting bore hole 18 which may be formed into flat planar horizontal section 13 which may be formed into the separate flat planar horizontal section 13 prior to assembly). The cutouts, i.e. elongated mounting bore hole 18, bore holes, C-shaped or stick-and-ball-shaped cutouts, may be formed when the L-shaped body 10 is first cast or may be formed using known metal cutting tools such as a sheet metal snip, jig saw, circular saw, angle grinder, reciprocating saw, air saw, cut off tool, die grinder, chop saw, torch or plasma cutter. In the preferred embodiments, the L-shaped body 10 is between 1 to 2 inches and the length of the planar vertical section 12 is 5½ inches and the length of the flat planar horizontal section 13 is between 1¼ to 1¾ inches.

Figure 23:
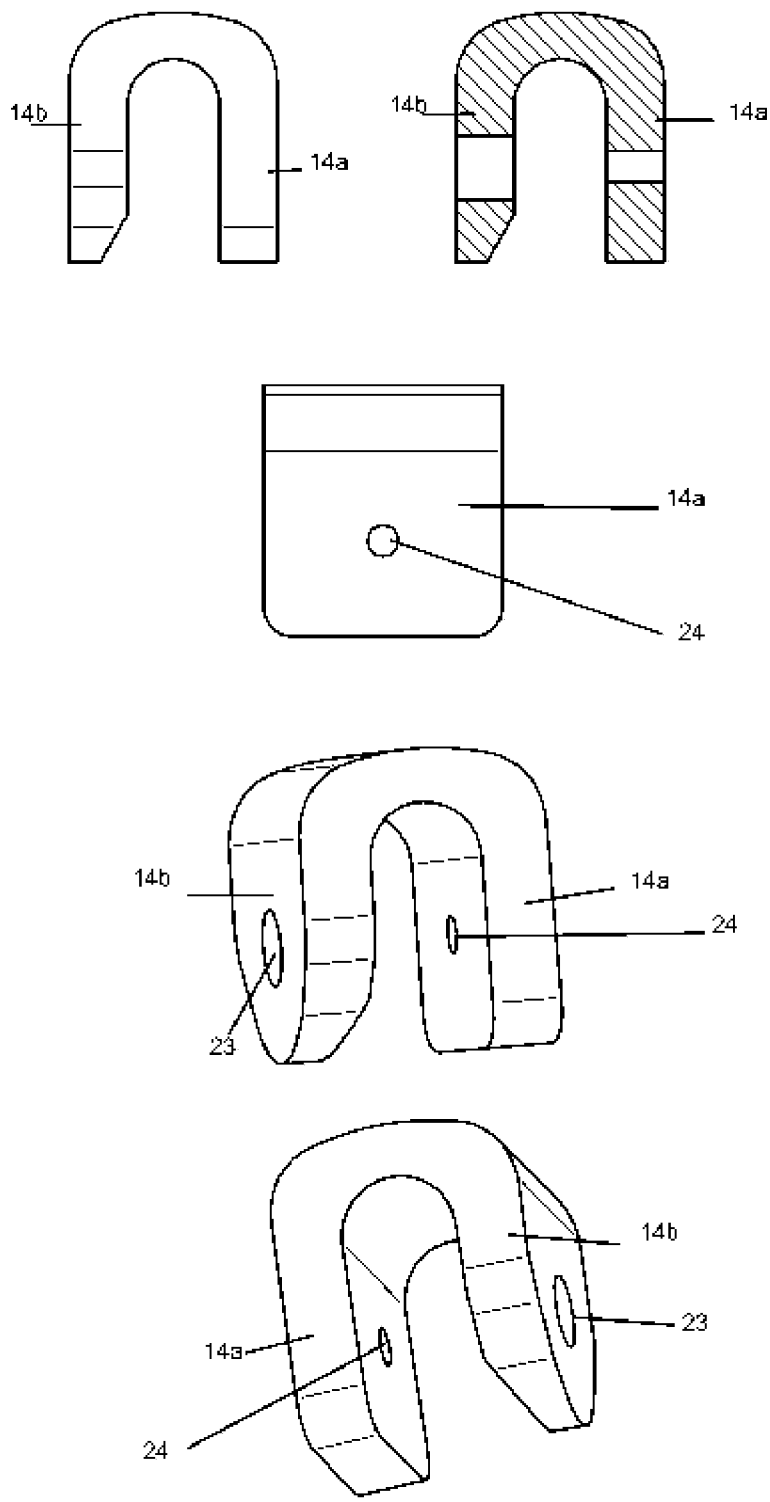
FIG. 23 are schematics of the U-shaped portion of a customized clamp according to the instant invention.
Figure 24A:
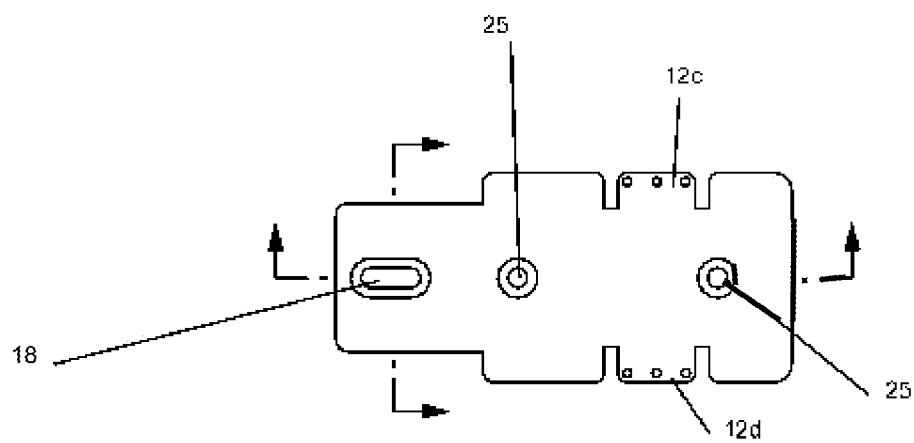
FIG. 24A-24H are diagrams of the L-shaped body according to the instant invention.
Figure 24B:
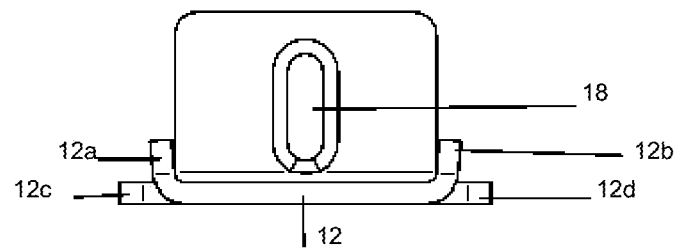
Figure 24C:
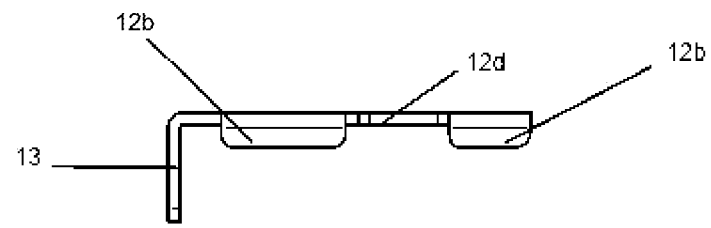
Figure 24D:
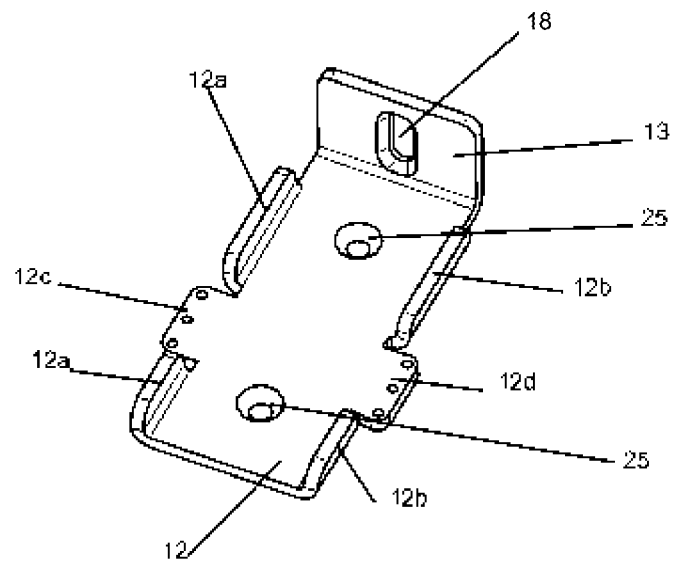
Figure 24E:
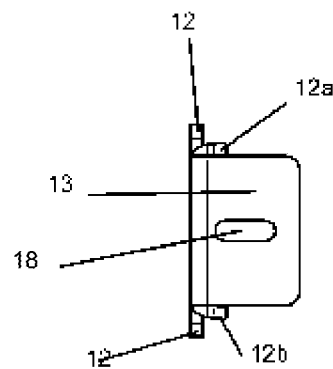
Figure 24F:
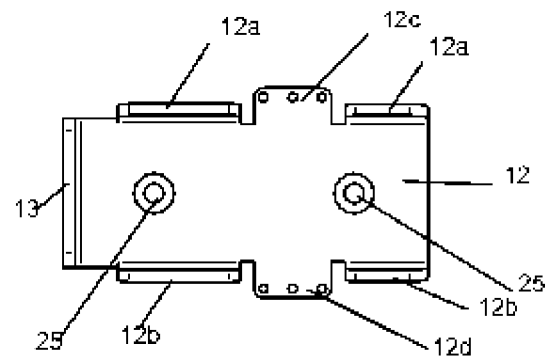
Figure 24G:
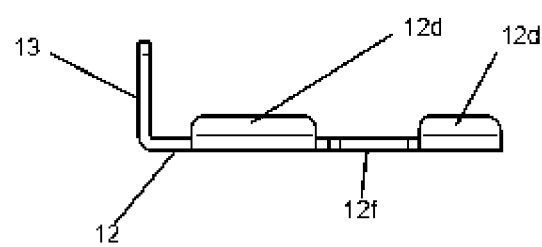
Figure 24H:
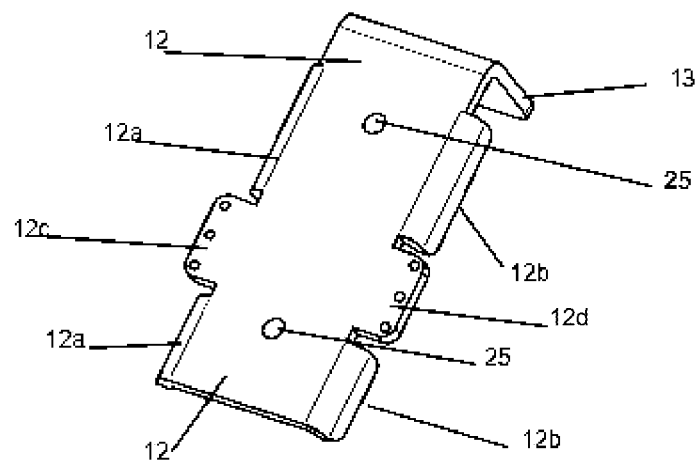

A c clamp screw compressor clamp 14, having a U-shaped body and an adjustable screw-portion 17, is employed in the preferred embodiment and in a more preferred embodiment the head of said screw-portion is serrated to provide the user a better grip in wet conditions. The legs 14a and 14b of the U-shaped body (See FIG. 23) may also be designed with inwardly facing flanges on the outer edges of the inner sides of said legs so as to "grip" the brim of the firefighter's helmet 1 on which the device is mounted. The inner side of the leg 14a of the U-shaped body that is opposite of the leg 14b in which the screw-portion is found, may be relatively straight (See FIG. 23) or formed with a downward angle, depending on the type of fire helmet on which the device is to be installed. In addition, it is forged with threaded hole 24 to accept the mounting screw 15 so as to secure the L-shaped body 10 to the c clamp 14 when the device is assembled. The leg 14b of the c clamp that accepts the mounting screw 17 is also forged with a threaded hole 23 to accept the mounting screw 17 used to secure the device to the brim 19 of a firefighter's helmet 1. The invention may utilize commercially available mini-clamps although clamps specifically designed for use in the claimed invention may also be used. In one embodiment, the L-shaped body 10 and c clamp 14 are made as one unit wherein the flat planar horizontal section 13 is formed with a c clamp 14 underneath.

Examples of commercially-available clamps include, but are not limited to, Grafco small c clamp screw compressor (Graham-Field Health Products, Atlanta, GA), ABTM Midget panel clamp (AES Industries, Inc., Tallassec, AL), A-TAC® Firefighter Structural Goggle Accessory A-PC (Paulson Manufacturing Corp., Temecula, CA), QuickFist® mini clamp (End of the Road, Inc., Nashville, TN), Universal Helmet Flashlight Holder 0770-010-110 (Pelican Products, Torrence, CA), ACE Firefighter Helmet Flashlight Holder (Pelican Products, Torrence, CA) or Universal Adjustable Helmet Clip (Underwater Kinetics, Poway, CA).

The claimed embodiments may or may not include a screw connecting the flat planar horizontal section 13 and the clamping means, i.e. c clamp 14. The claimed device utilizes commercially available screws and/or other fastening means.

The materials selected to manufacture the parts of the claimed invention must have certain characteristics due to the harsh environment in which the product will encounter. The selected materials need to be noncorrosive and chemical resistant as smoke can contain toxic chemicals due to the burning of synthetic household materials. In addition, chemicals used by firefighters, such as water-based fire-retardant foam, carbon dioxide, halon and/or sodium bicarbonate, can also corrode certain metals. Any materials used must be rust-resistant as water is the primary means in which to extinguish a fire. Durability and impact resistance are important characteristics as the claimed device will be subject to extreme conditions. The chosen material should be anti-static to prevent sparks in situations where flammable materials are involved. Materials that are up to 500° heat resistant are preferred. As the invention is worn on the head of the user any material used should be lightweight and be able to be molded/formed into a compact structure. For the preferred embodiment, aluminum was selected for it displays all the aforementioned characteristics.

The door chock 11 is retained in the L-shaped body 10 using any of a number of restraining means including, but not limited to, bungee cord, cable tie, circle cotter, cord, cotter pin, hairpin clip, knockout ring, o-ring, R-clip, rope, rubber band shock cord, helical or coil spring, strap, twine, thread and wire. In one embodiment, the securing means is a metal bar having a distal end and a proximal end wherein said distal end is affixed to one raised side edge by a hinge having a locking means, wherein said proximal end contains a locking means to secure said proximal end of said bar to the raised side edge opposite the raised side edge that the distal end is affixed provided that said metal bar is capable of moving away and towards said L-shaped body 10. In the preferred embodiments, a spring 16 (Acorn Engineering Company, Inc., City of Industry, CA), industrial rubber band 20 (Alliance Rubber Company, Hot Springs, AR) or o-ring 21 (Fed-Pro®, Federal-Mogul Motorparts LLC, Southfield, MI) is employed. The spring, rubber band 20 and o-ring 21 may be closed or open at both ends. If an open-ended version of the spring 16, rubber band 20 or o-ring 21 is used, the ends thereof should be modified with some type of attachment means, such as a hook, knob or button, which engages the bore holes, C-shaped or stick-and-ball-shaped cutouts found in the wings 12c and 12d.

The device is easily mounted to the brim of a traditional or modern firefighter's helmet 1. The user simply hooks the leading edge of the c clamp 14 over the brim of the helmet 1 while positioning the lagging end with the thumb screw 17 under the brim. By rotating the thumb screw 17, which in one embodiment has a serrated head, the opposite end of the thumb screw 17 advances towards the lower part of said brim eventually engaging same and securing the device.

Reflective strips may be affixed to the device to provide illumination in environments with limited visibility.

It should be appreciated that the claimed device may be modified to attach devices other than door chocks to a firefighter's helmet, such as a flashlight, screw driver and the like.

Kits

This disclosure also provides kits for conveniently and effectively implementing the device disclosed herein. Such kits comprise the L-shaped 10 body, an adjustable c clamp 14 capable of attachment to the brim of a traditional or modern firefighter's helmet, means in which to attach said L-shape body to the c clamp 14 (in the preferred embodiment said means is a screw), and means in which to secure a door chock 11 to the L-shaped body 10 (in the preferred embodiment said means can be a spring 16, rubber strap 20 or o-ring 21).

The claimed kits may require assembly prior to use.

EQUIVALENTS

Unless otherwise indicated, all numbers expressing quantities used in the specification and claims are to be understood as being modified in all instances by the term "about", "approximately" or "relatively." Accordingly, unless indicated to the contrary, the numerical parameters set forth in this specification and attached claims are approximations that may vary depending upon the desired properties sought to be obtained by the present invention.

The above discussion is meant to be illustrative of the principle and various embodiments of the present invention. While specific embodiments of the subject invention have been discussed, the above specification is illustrative and not restrictive. Many variations of the invention will become apparent to those skilled in the art upon review of this specification and once the above disclosure is fully appreciated. The full scope of the invention should be determined by reference to the claims, along with their full scope of equivalents, and the specification, along with such variations. It is intended that the following claims be interpreted to embrace all such variations and modifications.

What is claimed:

1. A device to secure a door chock to an industrial helmet comprising:
    an L-shaped body having a relatively flat planar vertical section and a relatively flat planar horizontal section;
    a clamp;
    means in which to secure said L-shaped body to said clamp; and
    means in which to secure said door chock to the L-shaped body;
    wherein said flat planar vertical section further comprises raised side walls extending outwards from said flat planar vertical section;
    wherein said raised side walls create a snug fit when said door chock is positioned in said device; and
    wherein said helmet is a firefighter's helmet having a brim.

2. The device according to claim 1, wherein securing said means in which to secure said door chock to the L-shaped body is selected from the group consisting of bungee cord, cable tie, circle cotter, cord, cotter pin, hairpin clip, knockout ring, o-ring, R-clip, rope, rubber band shock cord, helical or coil spring, strap, twine, thread and wire.

3. The device according to claim 1, further comprising one or more pairs of horizontal cuts into the planar vertical section, wherein each of the pair of horizontal cuts are forged into opposing sides of said planar vertical section;
    wherein said cuts accommodate and secure an o-ring to said device.

4. The device according to claim 1, wherein said clamp is a c clamp screw compressor clamp having a serrated thumb screw head;
    wherein a side of said c clamp opposing a side with the thumb screw head is positioned over the brim of the helmet and the side with the thumb screw is situated below the brim so that when the thumb screw head turns, a lower portion of the clamp comes in contact with the brim of said helmet securing said device to said helmet.

5. The device according to claim 1, wherein the planar horizontal section comprises a bore hole and a side of a c clamp opposing a thumb screw comprises a bore hole.

6. The device according to claim 5, wherein said bore hole in said planar horizontal section traverses an entire width of said planar horizontal section and is an elongated mount hole.

7. The device according to claim 5, wherein side walls of the bore hole of the planar horizontal section and side walls of the bore hole in the c clamp are threaded.

8. The device according to claim 1, wherein said L-shaped body is secured to said clamp with a screw.

9. The device according to claim 8, wherein said screw is capable of moving said L-shaped body across said clamp so as to position said L-shaped body closer to or farther away from the helmet to which said device is mounted and then securing said device to said helmet when an optimal positioning of said device has been determined.

10. The device according to claim 1, wherein said L-shaped body is forged as a single unit or the flat planar vertical section and the flat planar horizontal section are manufactured separately and then fused together.

11. The device according to claim 1, wherein the L-shaped body is manufactured from a material selected from the group consisting of high polymer resin, ceramic, a metal and any combination thereof, provided said material is impact and chemical resistant, anti-static, resistant to chemicals, lightweight, waterproof and up to 500° heat resistant.

12. The device according to claim 11, wherein said L-shaped body is manufactured from iron, aluminum, copper, carbide, cermet, stainless steel, polymide-imide (PAI), poly ether imide (PEI), polyacetal (POM), poly phenylene sulfide (PPS), poly ether ether ketone (PEEK), poly tetra fluoro ethylene (PTFE), polymide 6 (PA6), polyethylene (PE), polypropylene (PP), vinyl chloride resin (VC), polystyrene (PS), polyethylene-telephthalate (PET), acrylonitrile butadiene (ABS) and any combination thereof.

13. The device according to claim 12, wherein said L-shaped body and said clamp are formed from durable and lightweight aluminum or stainless steel or a steel alloy.

14. The device according to claim 1, wherein said device may be mounted on both traditional and modern style firefighter helmets.

15. The device according to claim 1, wherein a width of the L-shaped body is between 1 to 2 inches and a length of the planar vertical section is 5½ inches and a length of the flat planar horizontal section is between 1¼ to 1¾ inches.

16. The device according to claim 1, wherein said L-shaped body further comprises one or more holes.

* * * * *